US005268161A

United States Patent [19]

Nakagawa

[11] Patent Number: 5,268,161

[45] Date of Patent: Dec. 7, 1993

[54] PROCESS FOR PREPARING MOLECULAR SIEVES USING A 1,3,3,8,8-PENTAMETHYL-3-AZONIABICYCLO [3.2.1] OCTANE TEMPLATE

[75] Inventor: Yumi Nakagawa, Kensington, Calif.

[73] Assignee: Chevron Research and Technology Company, San Francisco, Calif.

[21] Appl. No.: 958,832

[22] Filed: Oct. 9, 1992

[51] Int. Cl.[5] .............................................. C01B 33/26

[52] U.S. Cl. ................................ 423/702; 423/328.2; 423/329.1; 423/706; 502/64

[58] Field of Search ............... 423/702, 704, 705, 706, 423/328.1, 328.2, 329.1; 502/64

[56] References Cited

U.S. PATENT DOCUMENTS

| | | | |
|---|---|---|---|
| 4,508,837 | 4/1985 | Zones | 502/60 |
| 4,861,570 | 8/1989 | Kuehl et al. | 423/706 |
| 5,053,373 | 10/1991 | Zones | 502/65 |
| 5,106,801 | 4/1992 | Zones et al. | 502/73 |

*Primary Examiner*—Anthony McFarlane

*Attorney, Agent, or Firm*—W. K. Turner; R. J. Sheridan

[57] ABSTRACT

The present invention relates to a process for preparing crystalline molecular sieves, particularly large pore zeolites, which comprises contacting active sources of one or more oxides selected from the group consisting of monovalent element oxides, divalent element oxides, trivalent element oxides, tetravalent element oxides, and pentavalent element oxides with an organocation templating agent derived from 1,3,3,8,8-pentamethyl-3-azoniabicyclo[3.2.1]octane.

20 Claims, No Drawings

PROCESS FOR PREPARING MOLECULAR SIEVES USING A 1,3,3,8,8-PENTAMETHYL-3-AZONIABICYCLO [3.2.1] OCTANE TEMPLATE

BACKGROUND OF THE INVENTION

Field of the Invention

The present invention relates to a process for preparing crystalline molecular sieves, particularly large pore zeolites, using a templating agent derived from 1,3,3,8,8-pentamethyl-3-azoniabicyclo[3.2.1]octane. More particularly, the process comprises contacting active sources of one or more oxides selected from the group consisting of monovalent element oxides, divalent element oxides, trivalent element oxides, tetravalent element oxides, and pentavalent element oxides with an organocation templating agent derived from 1,3,3,8,8-pentamethyl-3-azoniabicyclo[3.2.1]octane.

State of the Art

Natural and synthetic crystalline molecular sieves are useful as catalysts and adsorbents. Each crystalline molecular sieve is distinguished by a crystal structure with an ordered pore structure, and is characterized by a unique X-ray diffraction pattern. Thus, the crystal structure defines cavities and pores which are characteristic of the different species. The adsorptive and catalytic properties of each crystalline molecular sieve are determined in part by the dimensions of its pores and cavities. Accordingly, the utility of a particular molecular sieve in a particular application depends at least partly on its crystal structure.

In general, molecular sieves are prepared by crystallization in an aqueous reaction mixture containing an organic templating agent, such as a nitrogen containing organocation. By varying the synthesis conditions and composition of the reaction mixture different zeolites can be formed.

The choice of the organocation templating agent is believed to play an important role in the process of molecular sieve crystallization. Organic amines and quaternary ammonium cations were first used in the synthesis of zeolites in the early 1960s as reported by R. M. Barrer and P. J. Denny in *J. Chem. Soc.* 1961 at pages 971-982. This approach led to a significant increase in the number of new zeolitic structures discovered as well as an expansion in the boundaries of composition of the resultant crystalline products.

Previously, products with low silica to alumina ratios ($SiO_2/Al_2O_3 \leqq 10$) had been obtained, but upon using the organocations as components in the starting gels, zeolites with increasingly high $SiO_2/Al_2O_3$ were realized. Some of these materials are summarized by R. M. Barrer 1982, Hydrothermal *Chemistry of Zeolites*, New York: Academic Press, Inc.

It has been postulated that the positive charge of the organocation templating species (and its sphere of hydration) interacts favorably with negatively charged silicate subunits, resulting in the crystallization of the resultant molecular sieve. An example of such templating involves the crystallization of sodalite in the presence of tetramethylammonium (TMA) cation as reported by Ch. Baerlocher and W. M. Meier, 1969, *Helv. Chimica Acta* 52, 1853. The TMA cations are found within the cavities of the sodalite cages, yet the 6.9 Å diameter of the cation (7.3 Å when hydrated) precludes it from entering the cavity via the 6-membered ring portals after formation of the structure; therefore the sodalite cage must result from growth around the cation.

Unfortunately, the relationship between structure of the organocation and the resultant zeolite is far from predictable, as evidenced by the multitude of products which can be obtained using a single quaternary ammonium salt as reported by S. I. Zones et al., 1989, *Zeolites: Facts, Figures, Future*, ed. P. A. Jacobs and R. A. van Santen, pp. 299-309, Amsterdam: Elsevier Science Publishers., or the multitude of organocations which can produce a single zeolitic product as reported by R. M. Barrer, 1989, *Zeolite Synthesis*, ACS Symposium 398, ed. M. L. Occelli and H. E. Robson, pp. 11-27, American Chemical Society.

Thus, it is known that organocations exert influence on the zeolite crystallization process in many unpredictable ways. Aside from acting in a templating role, the organic cation's presence also greatly affects the characteristics of the gel. These effects can range from modifying the gel pH to altering the interactions of the various components via changes in hydration (and thus solubilities of reagents) and other physical properties of the gel. Accordingly, investigators have now begun to consider how the presence of a particular quaternary ammonium salt influences many of these gel characteristics in order to determine more rigorously how such salts exert their templating effects.

It has been noted that many of the organocations which have been used as templates for zeolite synthesis are conformationally flexible. These molecules can adopt many conformations in aqueous solution, therefore several templates can give rise to a particular crystalline product. Studies which involved alterations on such conformationally flexible organic amines and cations have been published. For example, one study, Rollmann and Valyocsik, 1985, Zeolites 5, 123, describes how varying the chain length for a series of $\alpha,\omega$-linear diamines resulted in different intermediate-pore products. It has also been recently reported by M. D. Shannon et al., 1991, *Nature* 353, 417-420 that three different products which have related framework topologies, can be formed from three linear bis-quaternary ammonium templates of varying chain lengths.

Altering the structure of a conformationally rigid organic molecule can also lead to a change in the zeolite obtained, presumably due to the differing steric demands of each template. S. I. Zones, 1989, *Zeolites* 9, 458-467 reported that in switching from 1,3-dimethylimidazolium hydroxide to 1,3-diisopropylimidazolium hydroxide as template, using the same starting gel ($SiO_2/Al_2\ O_3=100$), the former directs toward formation of ZSM-22 whereas the latter affords ZSM-23. Further investigations of the influence of conformationally constrained templating agents are reported in Y. Nakagawa, et al. *Synthesis of Microporous Materials, Volume I*, Chapter 16, M. Occelli, H. Robson, ed.; Van Nostrand Reinhold, New York, 1992.

In summary, a variety of templates have been used to synthesize a variety of molecular sieves, including zeolites of the silicate, aluminosilicate, and borosilicate family. However, the specific utility of a given template is at present unpredictable. In fact, the likelihood of any given organocation to serve as an effective templating agent useful in the preparation of molecular sieves is conjectural at best.

Despite the unpredictable nature of molecular sieve templates, educated trial and error has led to the discovery of a few notable cyclic-organocation templating agents. For instance, the use of N,N,N-trimethyl cyclopentylammonium iodide in the preparation of Zeolite SSZ-15 molecular sieve is disclosed in U.S. Pat. No. 4,610,854 issued on Sep. 9, 1986 to Zones; use of 1-azoniaspiro [4.4] nonyl bromide and preparation of a molecular sieve termed "Losod" is disclosed in *Hel. Chim. Acta* (1974), Vol. 57, page 1533 (W. Sieber and W. M. Meier); use of 1,ω-di(1-azoniabicyclo [2.2.2.] octane) lower alkyl compounds in the preparation of Zeolite SSZ-16 molecular sieve is disclosed in U.S. Pat. No. 4,508,837 issued on Apr. 2, 1985 to Zones; use of N,N,N-trialkylammonio-1-adamantanes in the preparation of Zeolite SSZ-13 molecular sieve is disclosed in U.S. Pat. No. 4,544,538 issued on Oct. 1, 1985 to Zones. U.S. Pat. No. 5,053,373 issued on Oct. 1, 1991 to Zones discloses preparing SSZ-32 with an N-lower alkyl-N'-isopropyl-imidazolium cation templating agent. U.S. Pat. No. 5,106,801 issued on Apr. 21, 1992 to Zones, et al discloses a cyclic quaternary ammonium ion, and specifically a tricyclodecane quaternary ammonium ion, for the preparation of the metallosilicate Zeolite SSZ-31. U.S. Pat. No. 4,910,006 issued on Mar. 20, 1990 to Zones, et al teaches using a hexamethyl[4.3.3.0]propellane-8,11-diammonium cation for the preparation of SSZ.26.

Specific aza-polycyclics have also been disclosed for use as templating agents for various crystalline materials. For example, EP 0193282 discloses a tropinium cation for preparing the clathrasil ZSM-58. Similarly, use of quinuclidinium compounds to prepare a zeolite termed "NU-3" is disclosed in European Patent Publication No. 40016. U.S. Pat. No. 4,285,922 issued Aug. 25, 1981 to Audeh, et al discloses preparing ZSM-5 using 1-alkyl-4-aza-1-azonia-bicyclo[2.2.2]octane-4-oxide halides; and U.S. Pat. No. 3,692,470 issued Sep. 19, 1972 discloses preparing ZSM-10 using 1,4-dimethyl-1,4-diazoniabicyclo[2.2.2]octane. The use of 3,7-diazabicyclo[3.3.1]nonanes as templating agents for SSZ-24 and other large pore zeolites is disclosed in commonly assigned concurrently filed U.S. patent application, Ser. No. 958,612, entitled "A PROCESS FOR PREPARING MOLECULAR SIEVES USING 3,7-DIAZABICYCLO[3.3.1]NONANE RING SYSTEM TEMPLATES". The use of sparteine salts as templating agents for SSZ-24 is disclosed in commonly assigned concurrently filed U.S. patent application, Ser. No. 959,001, entitled "A PROCESS FOR PREPARING MOLECULAR SIEVES USING A SPARTEINE RING SYSTEM TEMPLATE". The use of 9-azoniabicyclo[3.3.1]nonane salts as templating agents for SSZ-24 and other large pore zeolites is disclosed in commionly assigned concurrently filed, U.S. patent application, Ser. No. 958,634, entitled "A PROCESS FOR PREPARING MOLECULAR SIEVES USING 9-AZONIABICYCLO[3.3.1]NONANE RING SYSTEM TEMPLATES".

Thus, organocation templating agents have been used to prepare many different combinations of oxides with molecular sieve properties, with silicates, aluminosilicates, aluminophosphates, borosilicates and silicoaluminophosphates being well known examples.

OBJECTS OF THE INVENTION

It is the principle object of the process embodiment of the present invention to provide a method for synthesizing a variety of molecular sieves using a water-soluble conformationally constrained templating agent derived from a 1,3,3,8,8-pentamethyl-3-azoniabicyclo[3.2.1]octane.

This and other objects are accomplished by the invention summarized below.

SUMMARY OF THE INVENTION

The present invention is directed to a process for preparing molecular sieves, particularly those molecular sieves classified as large pore size zeolites, that is, zeolites having average pore diameters greater than about 6.0 Angstroms. The process is especially useful for preparing zeolites such as SSZ-35, also known as YN-1 described and claimed in commonly assigned concurrently filed U.S. patent application Ser. No. 959,205, entitled "ZEOLITE SSZ-35"; and SSZ-36, also known as YN-2 described and claimed herein.

In its broadest process embodiment the present invention is a method for synthesizing molecular sieves which comprises contacting active sources of one or more oxides selected from the group consisting of monovalent element oxides, divalent element oxides, trivalent element oxides, tetravalent element oxides, and pentavalent element oxides with an organocation templating agent having a 1,3,3,8,8-pentamethyl-3-azoniabicyclo[3.2.1]octane ring system.

Thus, the essence of the present invention resides in the discovery that various compositions of Zeolites SSZ-35 and SSZ-36 can be synthesized using a conformationally constrained water-soluble templating agent derived from 1,3,3,8,8-pentamethyl-3-azoniabicyclo[3.2.1]octane. The templating agents are characterized by a cation having a ring structure depicted as:

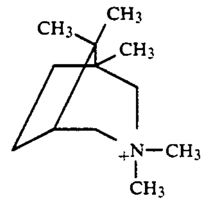

The full scope of the present invention will be apparent to those familiar with molecular sieve synthesis from the following detailed description of the principle features of the process embodiment and from the examples which accompany the description.

DETAILED DESCRIPTION OF THE INVENTION

Principle Features

In its process embodiment the present invention comprises contacting an active source of one or more oxides selected from the group consisting of monovalent element oxides, divalent element oxides, trivalent element oxides, tetravalent element oxides, and pentavalent element oxides with an organocation templating agent having a 1,3,3,8,8-pentamethyl-3-azoniabicyclo[3.2.1]octane ring system.

In practice the process may be carried out in steps which comprise:

(a) preparing an aqueous solution containing sources of at least one oxide capable of forming a crystalline molecular sieve and at least one conformationally constrained water-soluble 1,3,3,8,8-pentamethyl-3-azoniabicyclo[3.2.1]octane salt having an anion which is not detrimental to the formation of the molecular sieve;

(b) maintaining the aqueous solution under conditions sufficient to form crystals of molecular sieve; and (c) recovering the crystals of molecular sieve.

The Templating Agent

The templating agents useful in the present process are salts of 1,3,3,8,8-trimethyl-3-azonia[3.2.1]octane. They have a molecular structure of the general form:

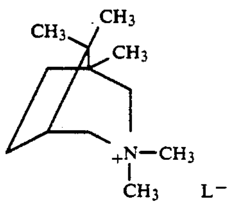

wherein L is an anion which is not detrimental to the formation of said molecular sieves.

In particular, each organocation of the family has a charged quaternary ammonium heteroatom and two rings, one of which includes the quaternary ammonium heteroatom as a bridging unit. The anion for the salt may be essentially any anion such as halide or hydroxide which is not detrimental to the formation of the molecular sieve. As used herein, "halide" refers to the halogen anions particularly fluorine, chlorine, bromine, iodine, and combinations thereof. Thus, representative anions include hydroxide, acetate, sulfate, carboxylate, tetrafluoroborate, and halides such as fluoride, chloride, bromide, and iodide. Hydroxide and iodide are particularly preferred as anions.

Many of the organocation salts which have been disclosed for use as templates for molecular sieve synthesis are conformationally flexible. These molecules can adopt many conformations in aqueous solution, and several templates can give rise to a single crystalline product. In contrast, the defined 1,3,3,8,8-pentamethyl-3-azoniabicyclo[3.2.1]octane templating agents used in the present invention are conformationally constrained organic molecules.

The template of interest is prepared by converting camphoric anhydride to the corresponding N-methyl imide using methyl amine. The imide can be reduced to N-methylcamphidine upon reduction with lithium aluminum hydride in ether, and the desired quaternary ammonium salt was obtained by treatment with methyl iodide. Following purification by recrystallization, the halide salt can be ion-exchanged to the corresponding hydroxide salt using an ion-exchange resin.

The Preparation of Molecular Sieves

As used herein the term "molecular sieve" refers to a material prepared according to the present invention having a fixed, open-network structure, usually crystalline, that may be used to separate hydrocarbons or other mixtures by selective occlusion of one or more of the constituents, or may be used as a catalyst in a catalytic conversion process.

As used herein the term "zeolite" refers to a molecular sieve containing a silicate lattice, usually in association with some aluminum, boron, gallium, iron, and/or titanium. In the following discussion, the terms molecular sieve and zeolite will be used more or less interchangeably, since most of the work was carried out on zeolites. However, one skilled in the art will recognize that the teachings relating to zeolites are also applicable to the more general class of materials called molecular sieves.

As used herein the term "silicate" refers to a zeolite having a high $SiO_2/Al_2O_3$ mole ratio, preferably a $SiO_2/Al_2O_3$ mole ratio greater than 100.

In preparing a molecular sieve, especially a zeolite, according to the present invention, a 1,3,3,8,8-pentamethyl-3-azoniabicyclo[3.2.1]octane salt described above is used as a crystallization template in the manner of other well known molecular sieve templating agents. Thus, the method of this invention for preparing crystalline molecular sieves can be used to prepare such sieves of different composition depending on starting materials and reaction conditions. For example, factors which may affect the crystallization of the molecular sieves formed include the source of inorganic reagents used, the concentration of alkali and/or silica or germanium and/or trivalent metal oxide, and the temperature and time.

The crystalline materials of this invention comprise the templating agent in combination with metallic and non-metallic oxides bonded in tetrahedral coordination through shared oxygen atoms to form a cross-linked three dimensional crystal structure. The metallic and non-metallic oxides comprise one or a combination of oxides selected from the group consisting of one or more trivalent element(s), and one or more tetravalent element(s). The trivalent element is preferably selected from the group consisting of aluminum, boron, iron, gallium, titanium, and combinations thereof. More preferably, the trivalent element is aluminum or boron. The tetravalent element is preferably selected from the group consisting of silicon, germanium, and combinations thereof. More preferably, the tetravalent element is silicon.

The crystalline material comprises one or a combination of oxides, said oxides being selected from monovalent elements, divalent elements, trivalent elements, tetravalent elements, and pentavalent elements. The crystalline material also contains the 1,3,3,8,8-pentamethyl-3-azoniabicyclo[3.2.1]octane templating agent described above.

The ranges of the mole ratios, in terms of oxides, for the various crystalline materials prepared by the process of this invention are very different. However, the general formula of the crystalline material composition, as synthesized and in the anhydrous state, in terms of oxide mole ratios, is (from about 0.5 to about 10)Q:(from about 0.1 to about 5.0)$M_2O$:$W_2O_3$:(greater than about 15)$YO_2$ wherein: Q is the 1,3,3,8,8-pentamethyl-3-azoniabicyclo[3.2.1]octane ring system templating agent described above; M is one or a combination of alkali metal cations and/or alkaline earth metal cations; W is one or a combination of elements selected from aluminum, boron, gallium, iron, titanium, and mixtures thereof; and Y is one or a combination of elements selected from silicon, germanium, and mixtures thereof.

The crystalline materials can be suitably prepared from an aqueous solution containing a salt of 1,3,3,8,8-pentamethyl-3-azoniabicyclo[3.2.1]octane, and at least one oxide capable of forming a crystalline molecular sieve. Examples of a suitable metal oxides include an alkali metal oxide, and oxides of aluminum, silicon, boron, germanium, iron, gallium, titanium, and the like.

The present process is suitable for preparing aluminosilicate and borosilicate zeolites from reaction mixtures prepared using standard zeolitic preparation techniques. As used herein the term "aluminosilicate" refers to a zeolite containing both aluminum and silicon. As used herein the term "borosilicate" refers to a zeolite containing both boron and silicon. Typical sources of aluminum oxide for the reaction mixture include aluminates, alumina, aluminum colloids, aluminum oxide coated on silica sol, hydrated alumina gels such as $Al(OH)_3$, and aluminum compounds such as $AlCl_3$ and $Al_2(SO_4)_3$. Typical sources of silicon oxide include silicates, silica hydrogel, fumed silica, silicic acid, colloidal silica, tetra-alkyl orthosilicates, and silica hydroxides. Boron as well as gallium, germanium, and iron can be added in forms corresponding to their aluminum and silicon counterparts.

Alternatively a source zeolite reagent may provide a source of aluminum or boron for the present process. In some cases, the source zeolite may also provide a source of silica.

Typically, an alkali metal hydroxide and/or an alkaline earth metal hydroxide, such as the hydroxide of sodium, potassium, lithium, cesium, rubidium, calcium, and magnesium, is used in the reaction mixture; however, this component can be omitted so long as the equivalent basicity is maintained. The defined 1,3,3,8,8-pentamethyl-3-azoniabicyclo[3.2.1]octane templating agent may be used to provide hydroxide ion. Thus, it may be beneficial to ion exchange, for example, the halide for hydroxide ion, thereby reducing or eliminating the alkali metal hydroxide quantity required. The alkali metal cation or alkaline earth cation may be part of the as-synthesized crystalline oxide material, in order to balance valence electron charges therein.

The present process is suitable for preparing silicates or "essentially alumina-free" zeolites, i.e., a product having a silica to alumina mole ratio of $\infty$. The term "essentially alumina-free" is used because it is difficult to prepare completely aluminum-free reaction mixtures for synthesizing these materials. Especially when commercial silica sources are used, aluminum is almost always present to a greater or lesser degree. The hydrothermal reaction mixtures from which the essentially alumina-free crystalline siliceous molecular sieves may be prepared can be referred to as being substantially alumina free. By this usage is meant that no aluminum is intentionally added to the reaction mixture, e.g., as an alumina or aluminate reagent, and that to the extent aluminum is present, it occurs only as a contaminant in the reagents. An additional method of increasing the mole ratio of silica to alumina is by using standard acid leaching or chelating treatments.

In preparing the crystalline material according to the present invention, the reaction mixture is maintained at an elevated temperature until crystals are formed. The temperatures during the hydrothermal crystallization step are typically maintained from about 100° C. to about 235° C., preferably from about 120° C. to about 200° C. The crystallization period is typically greater than 1 day and preferably from about 3 days to about 50 days.

The hydrothermal crystallization is usually conducted under pressure and usually in an autoclave so that the reaction mixture is subject to autogenous pressure. The reaction mixture can be stirred during crystallization.

Once the crystals have formed, the solid product is separated from the reaction mixture by standard mechanical separation techniques, such as filtration. The crystals are water-washed and then dried, e.g., at 90° C. to 150° C. for from 8 to 24 hours, to obtain the as-synthesized zeolite crystals. The drying step can be performed at atmospheric or subatmospheric pressures.

During the hydrothermal crystallization step, the crystals can be allowed to nucleate spontaneously from the reaction mixture. The reaction mixture can also be seeded with crystals both to direct, and accelerate the crystallization, as well as to minimize the formation of any undesired crystalline phases. When seed crystals are used, typically 0.1% to about 10% of the weight of silica used in the reaction mixture are added.

Due to the unpredictability of the factors which control nucleation and crystallization in the art of crystalline oxide synthesis, not every combination of reagents, reactant ratios, and reaction conditions will result in crystalline products. Selecting crystallization conditions which are effective for producing crystals may require routine modifications to the reaction mixture or to the reaction conditions, such as temperature, and/or crystallization time. Making these modifications are well within the capabilities of one skilled in the art.

Typically the crystalline material, more specifically the synthetic molecular sieve or zeolite, is thermally treated (calcined). Usually, it is desirable to remove the alkali metal cation by ion exchange and replace it with hydrogen, ammonium, or any desired metal ion. The zeolite can be leached with chelating agents, e.g., EDTA or dilute acid solutions, to increase the silica alumina mole ratio. The zeolite can also be steamed; steaming helps stabilize the crystalline lattice to attack from acids. The zeolite can be used in intimate combination with hydrogenating components, such as tungsten, vanadium molybdenum, rhenium, nickel cobalt, chromium, manganese, or a noble metal, such as palladium or platinum, for those applications in which a hydrogenation-dehydrogenation function is desired. Typical replacing cations can include metal cations, e.g., rare earth, Group IIA and Group VIII metals, as well as their mixtures. Of the replacing metallic cations, cations of metals such as rare earth, Mn, Ca, Mg, Zn, Cd, Pt, Pd, Ni, Co, Ti, Al, Sn, and Fe are particularly preferred.

Specific zeolites which may be formed by the process of the present invention include large pore zeolites. The process is especially useful for preparing zeolites such as Zeolite SSZ-35 which is described and claimed in commonly assigned concurrently filed U.S. application Ser. No. 959,205, entitled "ZEOLITE SSZ-35", by Y. Nakagawa, the disclosure of which is incorporated herein by reference. The process can also be used to prepare a novel zeolite, Zeolite SSZ-36 also known as YN-2, which is described and claimed herein.

It is believed that SSZ-36 is a family of zeolites having a mole ratio of an oxide selected from silicon oxide, germanium oxide and mixtures thereof to an oxide selected from aluminum oxide, gallium oxide, iron oxide, titanium oxide, boron oxide and mixtures thereof greater than about 15 and comprised of a new framework structure or topology which is characterized by its x-ray diffraction pattern. SSZ-36 zeolites, as-synthesized, have a crystalline structure whose x-ray powder diffraction pattern exhibit the characteristic lines shown in Table I and is thereby distinguished from other known zeolites.

TABLE I

| 2θ | d | 100 × I/I0 |
| --- | --- | --- |
| 8.58 | 10.31 | 82.4 |
| 9.03 | 9.79 | 96.0 |
| 10.08 | 8.77 | 30.4 |
| 15.83 | 5.60 | 33.3 |
| 19.52 | 4.55 | 92.0 |
| 20.11 | 4.42 | 91.2 |
| 25.14 | 3.54 | 100.0 |

After calcination, the SSZ-36 zeolites have a crystalline structure whose X-ray powder diffraction pattern include the characteristic lines shown in Table II:

TABLE II

| 2θ | d | 100 × I/I0 |
| --- | --- | --- |
| 8.59 | 10.29 | 76.1 |
| 9.05 | 9.77 | 100.0 |
| 10.11 | 8.75 | 43.5 |
| 15.85 | 5.59 | 4.3 |
| 19.52 | 4.55 | 31.7 |
| 20.11 | 4.42 | 28.7 |
| 25.14 | 3.54 | 49.1 |

The x-ray powder diffraction patterns were determined by standard techniques. The radiation was the K-alpha/doublet of copper. A scintillation counter spectrometer with a strip-chart pen recorder was used. The peak heights I and the positions, as a function of 2$\theta$ where $\theta$ is the Bragg angle, were read from the relative intensities, 100 x $I/I_o$ where $I_o$ is the intensity of the strongest line or peak, and d, the interplanar spacing in Angstroms corresponding to the recorded lines, can be calculated.

The X-ray diffraction pattern of Table I is representative of "as-made" SSZ-36 zeolites. Minor variations in the diffraction pattern can result from variations in the silica-to-alumina or silica-to-boron mole ratio of the particular sample due to changes in lattice constants. In addition, sufficiently small crystals will affect the shape and intensity of peaks, leading to significant peak broadening.

Representative peaks from the X-ray diffraction pattern of calcined SSZ-36 are shown in Table II. Calcination can also result in changes in the intensities of the peaks as well as minor shifts in the diffraction pattern. The zeolite produced by exchanging the metal or other cations present in the zeolite with various other cations (such as $H^+$ or $NH_4^+$) yields essentially the same diffraction pattern, although again, there may be minor shifts in the interplanar spacing and variations in the relative intensities of the peaks. Notwithstanding these minor perturbations, the basic crystal lattice remains unchanged by these treatments.

The hydrogen, ammonium, and metal components of zeolites prepared by the preseent process can be exchanged into the zeolite. The zeolite can also be impregnated with the metals, or, the metals can be physically and intimately admixed with the zeolite using standard methods known to the art. And the metals can be occluded in the crystal lattice by having the desired metals present as ions in the reaction mixture from which the zeolite is prepared.

Typical ion-exchange techniques involve contacting the synthetic zeolite with a solution containing a salt of the desired replacing cation or cations. Although a wide variety of salts can be employed, chlorides and other halides, acetates, nitrates, and sulfates are particularly preferred. The zeolite is usually calcined prior to the ion-exchange procedure to remove the organic matter present in the channels and on the surface, since this results in a more effective ion exchange. Representative ion exchange techniques are disclosed in a wide variety of patents including U.S. Pat. Nos. 3,140,249; 3,140,251; and 3,140,253 each of which issued on Jul. 7, 1964 to Plank, et al.

Following contact with the salt solution of the desired replacing cation, the zeolite is typically washed with water and dried at temperatures ranging from 65° C. to about 200° C. After washing, the zeolite can be calcined in air or inert gas at temperatures ranging from about 200° C. to about 800° C. for periods of time ranging from 1 to 48 hours, or more, to produce a catalytically active product especially useful in hydrocarbon conversion processes.

Regardless of the cations present in the synthesized form of the zeolite, the spatial arrangement of the atoms which form the basic crystal lattice of the zeolite remains essentially unchanged. The exchange of cations has little, if any effect on the zeolite lattice structures.

The molecular sieve can be formed into a wide variety of physical shapes. Generally speaking, the zeolite can be in the form of a powder, a granule, or a molded product, such as extrudate having a particle size sufficient to pass through a 2-mesh (Tyler) screen and be retained on a 400-mesh (Tyler) screen. In cases where the catalyst is molded, such as by extrusion with an organic binder, the aluminosilicate can be extruded before drying, or, dried or partially dried and then extruded.

The zeolite can be composited with other materials resistant to the temperatures and other conditions employed in organic conversion processes. Such matrix materials include active and inactive materials and synthetic or naturally occurring zeolites as well as inorganic materials such as clays, silica and metal oxides. The latter may be naturally occurring or may be in the form of gelatinous precipitates, sols, or gels, including mixtures of silica and metal oxides. Use of an active material in conjunction with the synthetic zeolite, combined with it, can improve the conversion and selectivity of the catalyst in certain organic conversion processes. Inactive materials can serve as diluents to control the amount of conversion in a given process so that products can be formed economically without using other means for controlling the rate of reaction. Frequently, zeolite materials have been incorporated into naturally occurring clays, e.g., bentonite and kaolin. These materials, i.e., clays, oxides, etc., function, in part, as binders for the catalyst. It is desirable to provide a catalyst having good crush strength and attrition resistance, because in petroleum refining the catalyst is often subjected to rough handling. This tends to break the catalyst down into powders which cause problems in processing.

Naturally occurring clays which can be composited with the synthetic zeolites of this invention include the montmorillonite and kaolin families, which families include the sub-bentonites and the kaolins commonly known as Dixie, McNamee, Georgia and Florida clays or others in which the main mineral constituent is halloysite, kaolinite, dickite, nacrite, or anauxite. Various clays such as sepiolite and attapulgite can also be used as supports. Such clays can be used in the raw state as originally mined or can be calcined, treated with acid, or chemically modified.

In addition to the foregoing materials, the zeolite can be composited with porous matrix materials and mixtures of matrix materials such as silica, alumina, titania, magnesia, silica-alumina, silica-magnesia, silica-zirconia, silica-thoria, silica-beryllia, silica-titania, titania-zirconia as well as ternary compositions such as silica-alumina-thoria, silica-alumina-zirconia, silica-alumina. magnesia and silica-magnesia-zirconia. The matrix can be in the form of a cogel.

The zeolite can also be composited with other zeolites such as synthetic and natural faujasites (e.g., X and Y), erionites, and mordenites. They can also be composited with purely synthetic zeolites. The combination of zeolites can also be composited in a porous inorganic matrix.

The zeolites prepared by the present process are useful in hydrocarbon conversion reactions. Hydrocarbon conversion reactions are chemical and catalytic processes in which carbon containing compounds are changed to different carbon containing compounds. Examples of hydrocarbon conversion reactions include catalytic cracking, hydrocracking, dewaxing, alkylation, and olefin and aromatics formation reactions.

Catalysts comprising such zeolites are also useful in other petroleum refining and hydrocarbon conversion reactions such as isomerizing n-paraffins and naphthenes, polymerizing and oligomerizing olefinic or acetylenic compounds such as isobutylene and butene-1, reforming, alkylating, isomerizing polyalkyl substituted aromatics (e.g., metaxylene), and disproportionating aromatics (e.g., toluene) to provide mixtures of benzene, xylenes and higher methylbenzenes. Catalysts comprising SSZ-35 have high selectivity, and under hydrocarbon conversion conditions can provide a high percentage of desired products relative to total products.

Catalysts comprising zeolites prepared by the present process, such as SSZ-35 and SSZ 36, can be used in processing hydrocarbonaceous feedstocks. Hydrocarbonaceous feedstocks contain carbon compounds and can be from many different sources, such as virgin petroleum fractions, recycle petroleum fractions, shale oil, liquefied coal, tar sand oil, and, in general, can be any carbon containing fluid susceptible to zeolitic catalytic reactions. Depending on the type of processing the hydrocarbonaceous feed is to undergo, the feed can contain metal or be free of metals, it can also have high or low nitrogen or sulfur impurities. It can be appreciated, however, that in general processing will be more efficient (and the catalyst more active) the lower the metal, nitrogen, and sulfur content of the feedstock.

The conversion of hydrocarbonaceous feeds can take place in any convenient mode, for example, in fluidized bed, moving bed, or fixed bed reactors depending on the types of process desired. The formulation of the catalyst particles will vary depending on the conversion process and method of operation.

Other reactions which can be performed using catalysts comprising zeolites prepared by the present process additionally comprising a metal, e.g., a Group VIII metal such platinum, include hydrogenation-dehydrogenation reactions, denitrogenation and desulfurization reactions.

The following examples demonstrate but do not limit the present invention.

EXAMPLES

There are numerous variations on the embodiments of the present invention illustrated in the Examples which are possible in light of the teachings supporting the present invention. It is therefore understood that within the scope of the following claims, the invention may be practiced otherwise than as specifically described or exemplified.

Example 1

Preparation of 1,3,3,8,8-pentamethyl-3-azoniabicyclo[3.2.1]octane hydroxide

Step 1: Preparation of Camphorimide

A 5-liter flask was charged with 3900 mL of 40% aqueous methyl amine and 275 g (1.51 mol) of camphoric anhydride. The mixing of these two reactants resulted in an exothermic reaction 37.25 g of 4-dimethylaminopyridine (0.30 mol) was then added and the reaction was stirred at room temperature for 2 hours. The reaction was then heated to reflux overnight, and was monitored by thin layer chromatography. After cooling, the reaction was acidified to a pH$<$2 with concentrated HCl. The resulting white precipitate was collected by filtration and washed with a small amount of ethyl acetate. After drying at reduced pressure, 237 g of the amide-acid as a white solid were obtained.

The filtrate was saturated with NaCl, transferred to a separatory funnel and extracted three times (400 mL) with ethyl acetate. The organic extracts were combined and dried of $MgSO_4$, filtered and concentrated to yield an additional 98 g of product as a light yellow solid.

A 5-liter 3-necked flask was charged with 3 liters of acetone, 639 g of the amide-acid (3.0 mol), and 613 g (6 mol) of triethylamine. The solution was heated to reflux and 464 g (4.5 mol) of acetic anhydride were added dropwise via an addition funnel. The reaction was stirred at reflux for 72 hours.

The acetone was removed by rotary evaporation and 400 mL of $H_2O$ was added to the remaining oil. The pH of the solution was adjusted to $<$2 using concentrated HCl, and then the solution was extracted three times (400 mL) with ethyl acetate. The combined organic extracts were washed twice (300 mL) with 1 N NaOH, then dried over $MgSO_4$. The solution was filtered and concentrated to yield 492 g of the camphorimide as an orange oil.

Step 2: Preparation of camphidine

A 5-liter flask was charged with 3 liters of dry diethyl ether and 157 grams of lithium aluminum hydride and placed in a large cooling bath (acetone/dry ice). An additional funnel was charged with 255 grams of camphorimide dissolved in 1.5 liter of $CH_2Cl_2$. The imide solution was added dropwise to the lithium aluminum hydride suspension. The reaction was exothermic and resulted in the evolution of gas. The reaction was kept cool by using a dry ice/acetone bath (−78° C.), and once addition was complete, the grey heterogeneous solution was stirred at room temperature overnight.

The following procedure should be performed with extreme caution. Once the reaction was complete, 143 g of $H_2O$ was slowly added to the reaction mixture, resulting in an exothermic reaction. Methylene chloride was added as necessary to replace the ether which evaporated. Following the addition of water, 143 mL of 15% aqueous NaOH was carefully added, followed by 430 mL of water. After stirring for 30 minutes, the mixture was filtered and the solids were washed with methylene chloride.

The filtrate was transferred to a separatory funnel, and 400 mL of water were added. The pH of the solution was adjusted to <2 with concentrated HCl, and the phases were separated. Two hundred mL of water was added to the organic phase, and the aqueous layer acidified with HCl, and then extracted. The aqueous layers were combined, basified (pH >12) with 50% NaOH, and saturated with NaCl. This was then extracted 3 times (400 mL) with ethyl acetate, and the combined organic extracts were dried over $MgSO_4$. After filtration and concentration, 149 grams of the crude camphidine were obtained.

Step 3: Quaternization of Camphidine

A 5-liter flask was charged with 2.4 liters of $CHCl_3$ and 400 g of camphidine (2.39 mol). Five hundred fifteen grams of methyl iodide (3.59 mol) were added dropwise to the solution over a 30 minute period, resulting in an exothermic reaction. The reaction was stirred at room temperature for 1 week.

This solution was added dropwise to 6 liters of diethyl ether, resulting in the precipitation of a yellow solid which was collected by filtration. This solid was recrystallized from hot acetone/ether with a small amount of methanol to yield 700 grams of N-methyl camphidinium iodide.

Step 4: Ion-exchange of N-methyl Camphidinium Iodide

Bio-Rad AG 1-X8 ion-exchange resin (20–50 mesh, hydroxide form) was used to convert the iodide salt of Step 3 to the corresponding hydroxide in 87.8% yield. The yield of the conversion was based upon titration of the resultant solution using phenolphthalein as the indicator.

EXAMPLE 2

Preparation of an All-Silica SSZ-35

2.0 mmol of 1,3,3,8,8-pentamethyl-3-azoniabicyclo[3.2.1]octane as the hydroxide salt, 0.5 g 1.0N KOH, 0.62 g Cabosil M-5 and enough water to bring the $H_2O/SiO_2$ of the reaction to 44 were mixed in a 23 mL teflon cup. After heating in a Parr 4745 reactor at 160° C. for 27 days, a settled product was obtained. The product was collected by filtration, washed thoroughly with water, dried, and determined by XRD to be SSZ-35.

EXAMPLE 3

Preparation of an All-Silica SSZ-35 Using Seeding

The reaction as described in Example 2 above was repeated, with the exception of seeding with 0.005 g of SSZ-35 crystals. In this manner, the reaction time was decreased to 7 days.

EXAMPLE 4

Preparation of SSZ-35 Using Seeding 3.89 g of a 0.578M solution of 1,3,3,8,8-pentamethyl-3-azoniabicyclo[3.2.1]octane as the hydroxide salt, 4.05 g $H_2O$, 1.5 g 1.0 N KOH, and 0.0146 g Reheis F2000 aluminum hydroxide gel were mixed together to give a homogeneous solution. 0.92 g Cabosil M-5 and 0.01 g of SSZ-35 seed crystals were then added and the mixture was heated to 160° C. and rotated at 43 rpm for 5 days. The starting gel of this example has a $SiO_2/Al_2O_3$ of 200. The product after filtration, washing with distilled water, and drying in air was the crystalline material designated as SSZ-35.

EXAMPLE 5

Preparation of SSZ-35 Using Seeding 3.68 g of a 0.610M solution of 1,3,3,8,8-pentamethyl-3-azoniabicyclo[3.2.1]octane as the hydroxide salt, 3.11 g $H_2O$, 2.13 g 1.0 N KOH and 0.112 g $Al_2(SO_4)_3.18H_2O$ were mixed together and stirred to give a homogeneous solution. 0.85 g Cabosil M-5 was then mixed in with stirring, followed by the addition of 0.01 g of seed crystals of SSZ-35. The resulting reaction mixture was heated at 160° C. and rotated at 43 rpm for 7 days. The product which was obtained was determined by XRD to be SSZ-35.

EXAMPLE 6

Preparation of SSZ-35 Using Seeding 5.19 g of a 0.578M solution of 1,3,3,8,8-pentamethyl-3-azoniabicyclo[3.2.1]octane as the hydroxide salt, 5.18 g $H_2O$, 1.5 g 1.0N KOH, and 0.0585 g Reheis F2000 were mixed together to give a clear, homogeneous solution. 0.92 g Cabosil was then stirred in, followed by the addition of 0.02 g of SSZ-35 seed crystals. The reaction was heated at 160° C. and rotated at 43 rpm for 7 days. The solid which was obtained was analyzed and found to have a $SiO_2/Al_2O_3$ of 43 and was designated as SSZ-35 by XRD.

EXAMPLE 7

Preparation of Boron Containing SSZ-35

2.61 g of a 0.575M solution of 1,3,3,8,8-pentamethyl-3-azoniabicyclo[3.2.]octane as the hydroxide salt, 3.28 g $H_2O$, 1.3 g 1.0N NaOH and 0.019 g $Na_2B_4O_7.10H_2O$ were mixed to give a homogeneous solution. 0.62 g Cabosil M-5 was added, and the mixture was heated to 160° C. and rotated at 43 rpm for 6 days. The product which was obtained was filtered, washed, dried and determined by XRD to be SSZ-35.

EXAMPLE 8

Preparation of Boron Containing SSZ-36

0.045 g $Na_2B_4O_7.10H_2O$ was dissolved in 3.07 g of a 0.73M solution of 1,3,3,8,8-pentamethyl-3-azoniabicyclo[3.2.1]octane as the hydroxide salt in a teflon cup of a Parr 4745 reactor. 1.36 g Ludox AS-30 was added, and the mixture was heated to 150° C. for 10 days. A solid was obtained, which after filtering, washing and drying, was determined by XRD to be the new zeolite, SSZ-36. Analysis revealed that the product had a $SiO_2/B_2O_3$ of 68.

EXAMPLE 9

Preparation of Boron Containing SSZ-36

3.32 g of a 0.73M solution of 1,3,3,8,8-pentamethyl-3-azoniabicyclo[3.2.1]octane as the hydroxide salt, 4.19 g $H_2O$, 0.4 g 1.0N NaOH, and 0.095 g $Na_2B_4O_7.H_2O$ were mixed in a 23 mL teflon cup. 0.62 g Cabosil M-5 was added in with stirring to afford a homogeneous solution which had a $SiO_2/B_2O_3$ of 20 and was heated at 160° C. for 10 days to yield a product which was determined by XRD to be SSZ-36 (product $SiO_2/B_2O_3=58$).

EXAMPLE 10

Preparation of SSZ-36 Using Seeding 3.91 g of a 0.73M solution of 1,3,3,8,8-pentamethyl-3-azoniabicyclo[3.2.1]octane as the hydroxide salt, 2.25 g 1.0N KOH, 5.7 g $H_2O$ and 0.102 g Reheis F2000 are mixed in a 23 mL teflon cup. 0.92 g Cabosil M-5 is blended into the solution, followed by the addition of 0.01 g of SSZ-36. The reaction is heated at 170° C. and rotated at 43 rpm, and after 13 days a settled product is obtained and determined by XRD to be SSZ-36. The final product was found to have a $SiO_2/Al_2O_3$ or 30.

EXAMPLE 11

Preparation of SSZ-35 Using Seeding 16.35 g of a 0.610M solution of 1,3,3,8,8-pentamethyl-3-azoniabicyclo[3.2.1]octane as the hydroxide salt, 20.75 g $H_2O$, 5.0 g 1.0N KOH were mixed in a 125 mL teflon reactor. 0.146 g Reheis F2000 was dissolved in the solution, followed by the addition of 3.10 g Cabosil M-5. The mixture was stirred until it was homogeneous, seeded with 0.06 g of SSZ-35 and heated at 160° C. in a Blue M oven in a Parr autoclave. After 7 days, a solid was obtained, which was determined by XRD to be SSZ-35.

EXAMPLE 12

Preparation of SSZ-35

4.92 g of a 0.610M solution of 1,3,3,8,8-pentamethyl-3-azoniabicyclo[3.2.1]octane as the hydroxide salt, 4.33 g $H_2O$, 2.62 g 1.0N KOH, and 0.125 g $Al_2(SO_4)_3.18H_2O$ were mixed together, followed by the addition of 0.92 g Cabosil M-5. The reaction was heated to 160° C. and rotated at 43 rpm for 7 days, and the product obtained was filtered, washed, dried and shown by XRD to be SSZ-35.

EXAMPLE 13

Preparation of SSZ-35

0.67 g of 1,3,3,8,8-pentamethyl-3-azoniabicyclo[3.2.1]octane as the iodide salt, 3.0 g 1.0N KOH, and 5.71 g $H_2O$ were added to a teflon cup of a Parr 4745 reactor. 0.036 g Reheis F2000 was dissolved in the solution, followed by the addition of 3.0 g Ludox AS-30 (Dupont) and 0.009 g of SSZ-35 seeds. The raction mixture was heated at 160° C. and rotated at 43 rpm. After 5 days, a settled product was obtained and determined to be SSZ-35.

What is claimed is:

1. A process for preparing crystalline molecular sieves comprising: contacting active sources of one or more oxides capable of forming a crystalline molecular sieve with an organocation templating agent having a 1,3,3,8,8-pentamethyl-3-azoniabicyclo[3.2.1]octane ring system.

2. A process according to claim 1 wherein said oxide source is selected from the group consisting of monovalent element oxides, divalent element oxides, trivalent element oxides, tetravalent element oxides, and pentavalent element oxides.

3. A process according to claim 1 wherein said templating agent has the general formula:

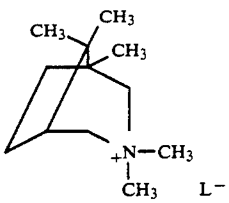

wherein L is an anion which is not detrimental to the formation of said molecular sieve.

4. A process according to claim 3 wherein L is selected from the group consisting of halide or hydroxide.

5. A process according to claim 4 wherein said halide is selected from the group consisting of fluorine, chlorine, bromine, iodine, and combinations thereof.

6. A process according to claim 5 wherein said halide is iodide.

7. A process according to claim 1 wherein said molecular sieve is a large pore zeolite.

8. A process according to claim 7 wherein said molecular sieve is a crystalline silicate.

9. A process according to claim 7 wherein said molecular sieve is a crystalline aluminosilicate.

10. A process according to claim 7 wherein said molecular sieve is a crystalline borosilicate.

11. A process according to claim 8 wherein said zeolite is SSZ-35.

12. A process according to claim 9 wherein said zeolite is SSZ-35.

13. A process according to claim 10 wherein said zeolite is SSZ-35.

14. A process according to claim 9 wherein said zeolite is SSZ-36.

15. A process according to claim 10 wherein said zeolite is SSZ-36.

16. A process for preparing the zeolite SSZ-36 which comprises:

(a) preparing an aqueous solution containing sources of an alkali metal oxide, an oxide selected from the oxides of aluminum, boron, iron, gallium, or titanium, an oxide selected from silicon or germanium oxide, and at least one conformationally constrained water-soluble 1,3,3,8,8-pentamethyl-3-azoniabicyclo[3.2.1]octane salt having an anion which is not detrimental to the formation of the molecular sieve;

(b) maintaining the aqueous solution under conditions sufficient to form crystals of molecular sieve; and (c) recovering the crystals of molecular sieve.

17. A process for preparing the large pore zeolite SSZ-35 which comprises:

(a) preparing an aqueous solution containing sources of at least one oxide capable of forming SSZ-35 and at least one conformationally constrained water-soluble 1,3,3,8,8-pentamethyl-3-azoniabicyclo[3.2.1]octane salt having an anion which is not detrimental to the formation of the molecular sieve;

(b) maintaining the aqueous solution under conditions sufficient to form crystals of molecular sieve; and (c) recovering the crystals of molecular sieve.

18. A crystalline material composition, as synthesized and in the anhydrous state, whose general formula, in terms of oxide mole ratios, is (from about 0.5 to about 10)Q: (from about 0.1 to about 5.0)$M_2O$:$W_2O_3$:(greater than about 15)$YO_2$ wherein: Q is the 1,3,3,8,8-pentamethyl-3-azoniabicyclo[3.2.1]octane ring system templating agent described above; M is one or a combination of alkali metal cations and/or alkaline earth metal cations; W is one or a combination of elements selected from aluminum, boron, gallium, iron, titanium, and mixtures thereof; and Y is one or a combination of elements selected from silicon, germanium, and mixtures thereof.

19. A zeolite having a mole ratio of an oxide selected from silicon oxide, germanium oxide and mixtures thereof to an oxide selected from aluminum oxide, gallium oxide, iron oxide, titanium oxide, boron oxide and mixtures thereof greater than about 15 and having the X-ray diffraction lines of Table I.

20. A zeolite having a mole ratio of an oxide selected from silicon oxide, germanium oxide and mixtures thereof to an oxide selected from aluminum oxide, gallium oxide, iron oxide, titanium oxide, boron oxide and mixtures thereof greater than about 15 and having the X-ray diffraction lines of Table II.

* * * * *